(12) United States Patent
Ueda et al.

(10) Patent No.: US 7,559,256 B2
(45) Date of Patent: Jul. 14, 2009

(54) FLOW RATE MEASURING DEVICE

(75) Inventors: Naotsugu Ueda, Kyoto (JP); Satoshi Nozoe, Toyonaka (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/993,803

(22) PCT Filed: May 26, 2006

(86) PCT No.: PCT/JP2006/310560

§ 371 (c)(1),
(2), (4) Date: Sep. 9, 2008

(87) PCT Pub. No.: WO2007/000865

PCT Pub. Date: Jan. 4, 2007

(65) Prior Publication Data

US 2008/0314140 A1 Dec. 25, 2008

(30) Foreign Application Priority Data

Jun. 24, 2005 (JP) ............................. 2005-184672

(51) Int. Cl.
*G01F 1/00* (2006.01)
*G01F 1/37* (2006.01)
*G01F 15/14* (2006.01)
(52) U.S. Cl. .................... 73/861; 73/861.52; 73/273
(58) Field of Classification Search .................. None
See application file for complete search history.

(56) References Cited

U.S. PATENT DOCUMENTS 3,482,771 A * 12/1969 Thylefors ................ 494/65
5,147,426 A * 9/1992 Koike et al. ............. 73/863.22

FOREIGN PATENT DOCUMENTS

| DE | WO 99/53274 | 10/1999 |
| DE | WO 01/79790 A1 | 10/2001 |
| EP | 1 568 999 A | 8/2006 |
| JP | 11-166720 | 6/1999 |
| JP | 2002-005712 | 1/2002 |

OTHER PUBLICATIONS

Notification of Transmittal of Copies of Translation of the International Preliminary Report on Patentability (Chapter I or Chapter II of the Patent Cooperation Treaty) for International Application No. PCT/JP2006/310560, mailed on Jan. 10, 2008 (7 pages).
Patent Abstracts of Japan, Publication No. 2002-005712 dated Jan. 9, 2001, 1 page.
International Search Report issued in PCT/JP2006/310560 mailed on Jun. 27, 2006 (3 pages).
Extended European Search Report from Application No. 06746889.2 dated Nov. 19, 2008 (7 pages).

* cited by examiner

*Primary Examiner*—Harshad Patel
(74) *Attorney, Agent, or Firm*—Osha • Liang LLP

(57) ABSTRACT

A flow rate measuring device has a flow channel including: a pair of first and second centrifugal chambers each having a curved wall surface; a first guiding flow channel allowing a first secondary flow channel to communicate with one end of the wall surface of the first centrifugal chamber; an intermediate flow channel allowing the other end of the wall surface of the first centrifugal chamber to communicate with one end of the wall surface of the second centrifugal chamber; a second guiding flow channel allowing the other end of the wall surface of the second centrifugal chamber to communicate with a second secondary flow channel; a first flow dividing channel communicating with the first centrifugal chamber; a second flow dividing channel communicating with the second centrifugal chamber; and a detection space portion, in which a detection element is placed.

17 Claims, 16 Drawing Sheets

Fig. 15A
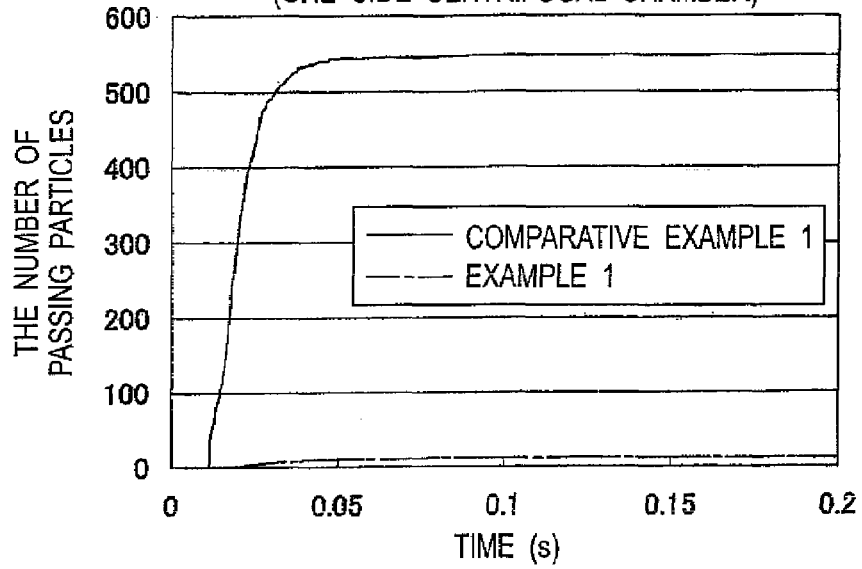
Fig. 15B
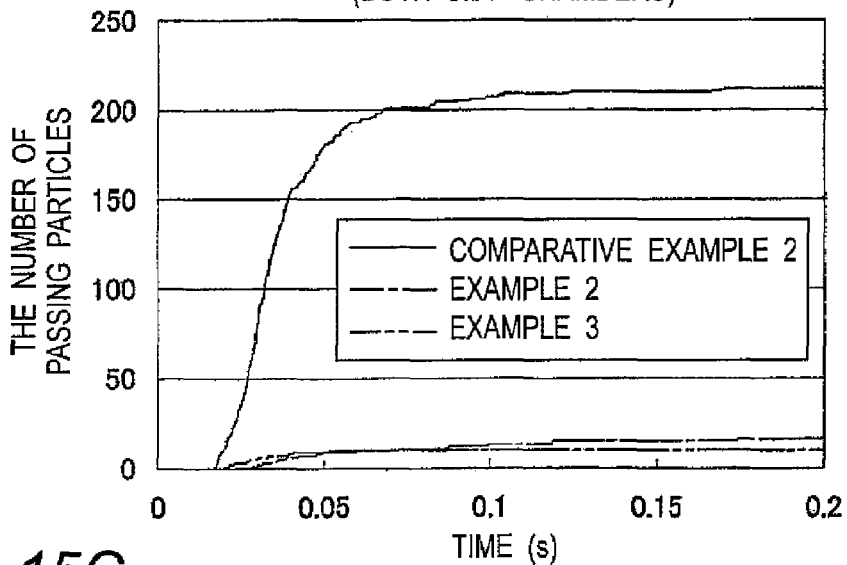
Fig. 15C
| | THE NUMBER OF REMAINING PARTICLES |
|---|---|
| COMPARATIVE EXAMPLE 2 | 68 |
| EXAMPLE 2 | 62 |
| EXAMPLE 3 | 27 |

FLOW RATE MEASURING DEVICE

TECHNICAL FIELD

The present invention relates to a flow rate measuring device, for example, a small sized flow rate measuring device used for an industrial equipment for monitoring an air flow rate in factories, a medical equipment such as a therapeutic instrument for sleep apnea syndrome.

BACKGROUND ART

Conventionally, a flow rate measuring device has a construction in which a detection element is placed in a flow channel and an air flow rate is measured. However, if the flow rate measuring device is used for a long term, dust in air adheres to and accumulates on the detection element, and measurement accuracy deteriorates. This may become a cause of failure.

In order to eliminate such a defect, there is a dust trap device having a structure in which trap walls are provided in a flow channel, dust in an airflow is caught by the trap walls so as to be separated by means of utilizing an inertial force of dust that goes straight, and only a clean airflow is led to the detection element (for example, see Patent Document 1).
Patent Document 1: JP11-166720A

DISCLOSURE OF THE INVENTION

Problem to be Solved by the Invention

However, since the above dust trap device separates dust by means of utilizing only the inertial force of dust that goes straight, if a flow velocity of air is low, an ability to separate dust from the air deteriorates and it is difficult to catch dust reliably. Further, even if dust can be caught by the trap walls, there is fear that dust that has accumulated by a long-term use falls into or is included in a flow channel on the detection element side. In particular, the dust trap device can only catch dust in an airflow flowing from one direction, and cannot cope with an airflow flowing from the opposite direction. Thus, there is a problem that a flow rate of a fluid flowing from two directions cannot be detected.

In view of the above problem, an object of the present invention is to provide a flow rate measuring device which can reliably separate dust from a fluid and can prevent a defect due to inclusion of dust despite its long-term use, in particular a flow rate measuring device which can also cope with a fluid flowing from two directions.

Means of Solving the Problem

In order to solve the above problem, there is provided a flow rate measuring device of the present invention in which a flow channel is formed, said flow channel comprising:
 a centrifugal chamber having a curved wall surface;
 a guiding flow channel allowing an external flow channel to communicate with one end of the wall surface of the centrifugal chamber from a tangential direction thereof;
 a discharge flow channel communicating with the other end of the wall surface of the centrifugal chamber from a tangential direction thereof; and
 a flow dividing channel communicating with the centrifugal chamber, generally perpendicular to a curved direction of the wall surface; wherein
 a detection element is placed on a downstream side of the flow dividing channel, a fluid that has been introduced into the centrifugal chamber from the external flow channel through the guiding flow channel is divided with the discharge flow channel and the flow dividing channel, and a flow rate of a fluid taken out from the flow dividing channel is measured by the detection element.

Effect of the Invention

According to the present invention, a centrifugal force acts on dust that has flowed into the centrifugal chamber from the guiding flow channel, and the dust flows along the wall surface of the centrifugal chamber, so that only a clean fluid flows into the detection element from the flow dividing channel. Therefore, the dust does not adhere to or accumulate on the detection element and it is possible to prevent deterioration in measurement accuracy of the detection element or failure of the detection element. Further, since the separated dust is discharged from the centrifugal chamber together with the fluid, accumulation of dust is small despite its long-term use. Therefore, a flow rate measuring device which is easy in maintenance and has a long lifetime can be obtained.

In another flow rate measuring device of the present invention, a flow channel forming plate is interposed between a first layer base plate and a second layer base plate;
 between the first layer base plate and the flow channel forming plate, the centrifugal chamber having the curved wall surface, the guiding flow channel allowing the external flow channel to communicate with said one end of the wall surface of the centrifugal chamber from the tangential direction thereof, and the discharge flow channel communicating with said the other end of the wall surface of the centrifugal chamber from the tangential direction thereof are formed; and,
 between the flow channel forming plate and the second layer base plate, a flow dividing channel, which communicates with the centrifugal chamber through a flow dividing hole provided in the flow channel forming plate, and in which a detection element is placed on its downstream side, is formed,
 a fluid that has been introduced into the centrifugal chamber from the external flow channel through the guiding flow channel is divided with the discharge flow channel and the flow dividing channel, and a flow rate of a fluid taken out from the flow dividing channel is measured by the detection element.

According to the present invention, in addition to the above effect, complicated three dimensional flow channels can easily be formed by a combination of the first layer base plate and the second layer base plate, and the manufacture is facilitated.

In an embodiment of the present invention, the guiding flow channel may be formed so as to be inclined in a direction opposite to a flow direction of the external flow channel.

According to the present embodiment, since the guiding flow channel is inclined in the direction opposite to the flow direction of the external flow channel, a flow velocity increases by the gushing effect of the flow and it is possible to enhance the centrifugal separation effect on dust.

There is provided with another flow rate measuring device of the present invention in which a flow channel is formed, said flow channel comprising:
 a pair of first and second centrifugal chambers each having a curved wall surface;
 a first guiding flow channel allowing a first external flow channel to communicate with one end of the wall surface of the first centrifugal chamber from a tangential direction thereof;
 an intermediate flow channel communicating with the other end of the wall surface of the first centrifugal chamber from a tangential direction thereof, as well as communicating with one end of the wall surface of the second centrifugal chamber from a tangential direction thereof;

a second guiding flow channel allowing a second external flow channel to communicate with the other end of the wall surface of the second centrifugal chamber from a tangential direction thereof;

a first flow dividing channel communicating with the first centrifugal chamber, generally perpendicular to a curved direction of the wall surface of the first centrifugal chamber;

a second flow dividing channel communicating with the second centrifugal chamber, generally perpendicular to a curved direction of the wall surface of the second centrifugal chamber; and a detection space portion, which allows the first flow dividing channel and the second flow dividing channel to communicate with each other, and in which a detection element is placed; wherein a fluid that has been introduced into the first centrifugal chamber from the first external flow channel through the first guiding flow channel is divided with the intermediate flow channel and the first flow dividing channel, and a flow rate of a fluid taken out from the first flow dividing channel can be measured by the detection element, and a fluid that has been introduced into the second centrifugal chamber from the second external flow channel through the second guiding flow channel is divided with the intermediate flow channel and the second flow dividing channel, and a flow rate of a fluid taken out from the second flow dividing channel can be measured by the detection element.

According to the present invention, a centrifugal force acts on dust that has flowed into the first and second centrifugal chambers from the first and second guiding channels respectively, and the dust flows along the wall surfaces of the first and second centrifugal chambers, so that only a clean fluid flows into the detection element from the first and second flow dividing channels. Therefore, the dust does not adhere to or accumulate on the detection element, and it is possible to prevent deterioration in measurement accuracy or failure of the detection element. Further, since the separated dust is discharged into the first and second external flow channels together with the fluid, accumulation of dust is small despite its long-term use. Therefore, a flow rate measuring device which is easy in maintenance and has a long lifetime can be obtained. In particular, according to the present invention, it is possible to cope with a fluid flowing from two directions by the pair of centrifugal chambers, and a versatile flow rate measuring device is obtained.

In another flow rate measuring device of the present invention, a flow channel forming plate is interposed between a first layer base plate and a second layer base plate;

between the first layer base plate and the flow channel forming plate, a pair of first and second centrifugal chambers each having a curved wall surface, a first guiding flow channel allowing a first external flow channel to communicate with one end of the wall surface of the first centrifugal chamber from a tangential direction thereof, an intermediate flow channel communicating with the other end of the wall surface of the first centrifugal chamber from a tangential direction thereof, as well as communicating with one end of the wall surface of the second centrifugal chamber from a tangential direction thereof, and a second guiding flow channel allowing a second external flow channel to communicate with the other end of the wall surface of the second centrifugal chamber from a tangential direction thereof are formed; and, between the flow channel forming plate and the second layer base plate, a first flow dividing channel communicating with the first centrifugal chamber, generally perpendicular to a curved direction of the wall surface of the first centrifugal chamber, and a second flow dividing channel communicating with the second centrifugal chamber, generally perpendicular to a curved direction of the wall surface of the second centrifugal chamber are formed, and a detection space portion, which allows the first flow dividing channel and the second flow dividing channel to communicate with each other, and in which a detection element is placed, is formed, a fluid that has been introduced into the first centrifugal chamber from the first external flow channel through the first guiding flow channel is divided with the intermediate flow channel and the first flow dividing channel, and a flow rate of a fluid taken out from the first flow dividing channel can be measured by the detection element, and a fluid that has been introduced into the second centrifugal chamber from the second external flow channel through the second guiding flow channel is divided with the intermediate flow channel and the second flow dividing channel, and a flow rate of a fluid taken out from the second flow dividing channel can be measured by the detection element.

According to the present embodiment, in addition to the above effect, complicated three dimensional flow channels can easily be formed by a combination of the first layer base plate and the second layer base plate, and the manufacture is facilitated.

In an embodiment of the present invention, each of the first and second guiding flow channels may be formed so as to be inclined in a direction opposite to a flow direction of each of the first and second external flow channels.

According to the present embodiment, since each of the guiding flow channels is inclined in the direction opposite to the flow direction of each of the first and second external flow channels, a flow velocity increases by a gushing effect of the fluid that flows and it is possible to enhance a centrifugal separation effect on dust.

In another embodiment of the present invention, the intermediate flow channel may be bent in a generally V-shape.

According to the present embodiment, of the pair of first and second centrifugal chambers, a flow velocity in the discharge side centrifugal chamber increases, and a greater centrifugal force acts thereon, so that it becomes easier to discharge dust.

In another embodiment of the present invention, the centrifugal chamber may have a cylindrical shape.

According to the present embodiment, since a fluid flow forms a circle, the centrifugal force acts toward the wall surface in a manner so as to be always perpendicular to a fluid flow direction, dust separation efficiency is high.

In a different embodiment of the present invention, one end of the flow dividing channel may be formed of a cylindrical portion protruding into the centrifugal chamber.

According to the present embodiment, for example, even if the flow dividing channel is placed so as to be located at a bottom surface of the centrifugal chamber, dust separated from the fluid flow due to gravitation cannot flow over the cylindrical portion, so that there is an effect that dust is prevented from flowing into the flow dividing channel more.

BRIEF DESCRIPTION OF DRAWINGS

FIG. 15A is a graph chart showing calculation results of Example 1 and Comparative Example 1, and FIG. 15B, FIG. 15C are graph charts showing calculation results of Examples 2, 3 and Comparative Example 2.

DESCRIPTION OF NUMERALS

Figure 1:
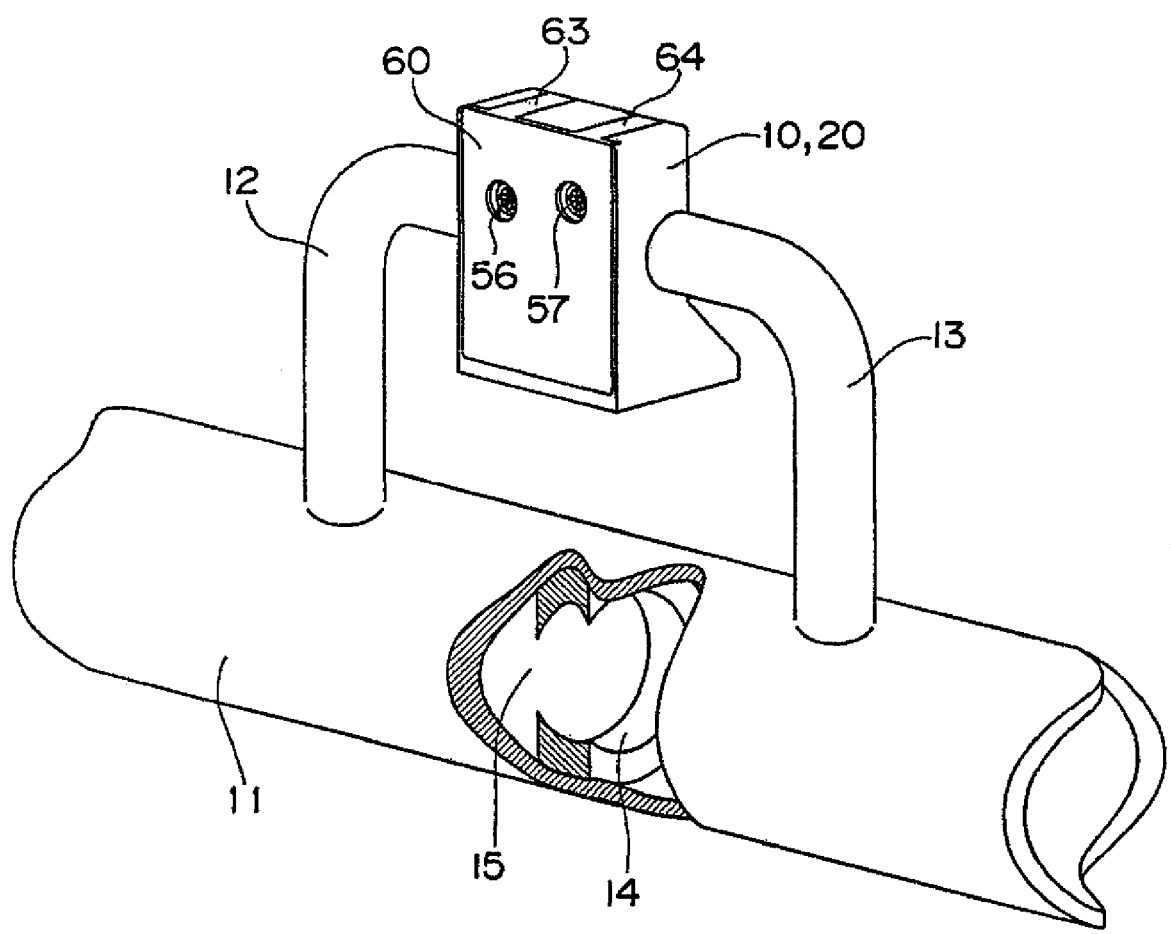
FIG. 1 is a perspective view showing an attached state of a first embodiment of the flow rate measuring device of the present invention.
Figure 2A:
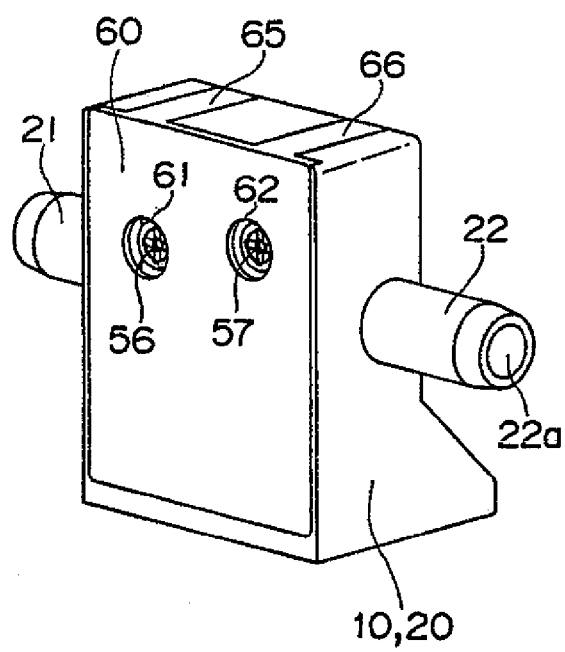
FIG. 2A, FIG. 2B and FIG. 2C are perspective views of the flow rate measuring device shown in FIG. 1, which are seen from different visual points.
Figure 2B:
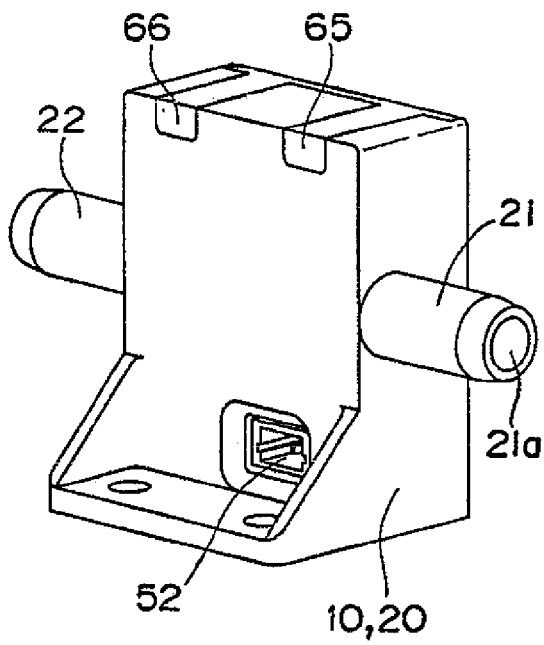
Figure 2C:
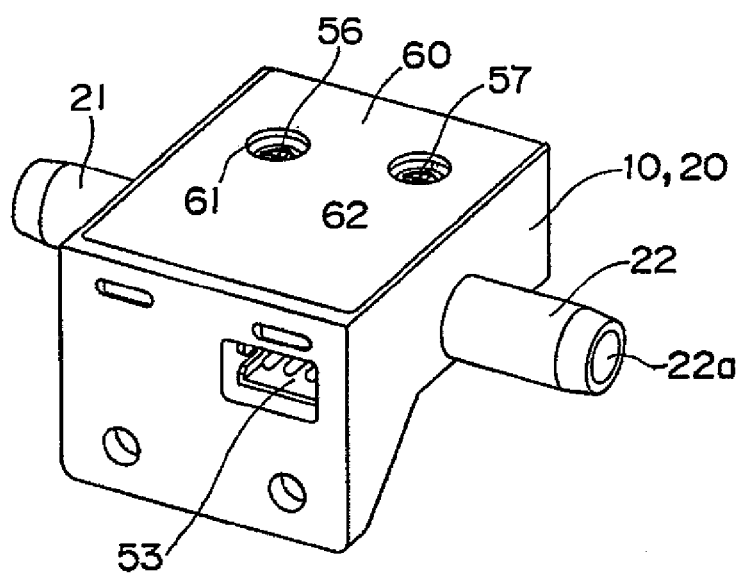

10: flow rate measuring device
11: primary flow pipe
12, 13: first, second connection pipes
14: orifice
15: primary flow channel
20: base
21, 22: first, second inlet/outlet pipes
21a, 22a: first, second secondary flow channels
23: recessed portion
23a: communication flow channel
23b: detection space portion
24: recess
25, 26: first, second centrifugal chambers
27, 28: first, second guiding flow channels
29: intermediate flow channel
30: flow channel forming plate
31, 32: first, second flow dividing holes
33, 34: first, second cylindrical portions
35, 36: first, second flow dividing channels
40: plate-like sealing member
41: detection hole
50: circuit board
51: detection element
60: cover
61, 62: adjustment openings
63, 64: engagement openings.
65, 66: elastic arm portions

BEST MODE FOR CARRYING OUT THE INVENTION

An embodiment of a flow rate measuring device according to the present invention will be described with reference to the accompanying drawings of FIGS. 1 to 12.

As shown in FIG. 1, a flow rate measuring device 10 of the present embodiment is connected to a primary flow pipe 11 through a first connection pipe and a second connection pipe 12, 13. In particular, the first and second connection pipe 12, 13 are connected to an upstream side and a downstream side, respectively, of a primary flow channel 15 passing through an annular orifice 14 formed on an inner peripheral surface of the primary flow pipe mm 11.

Figure 3:
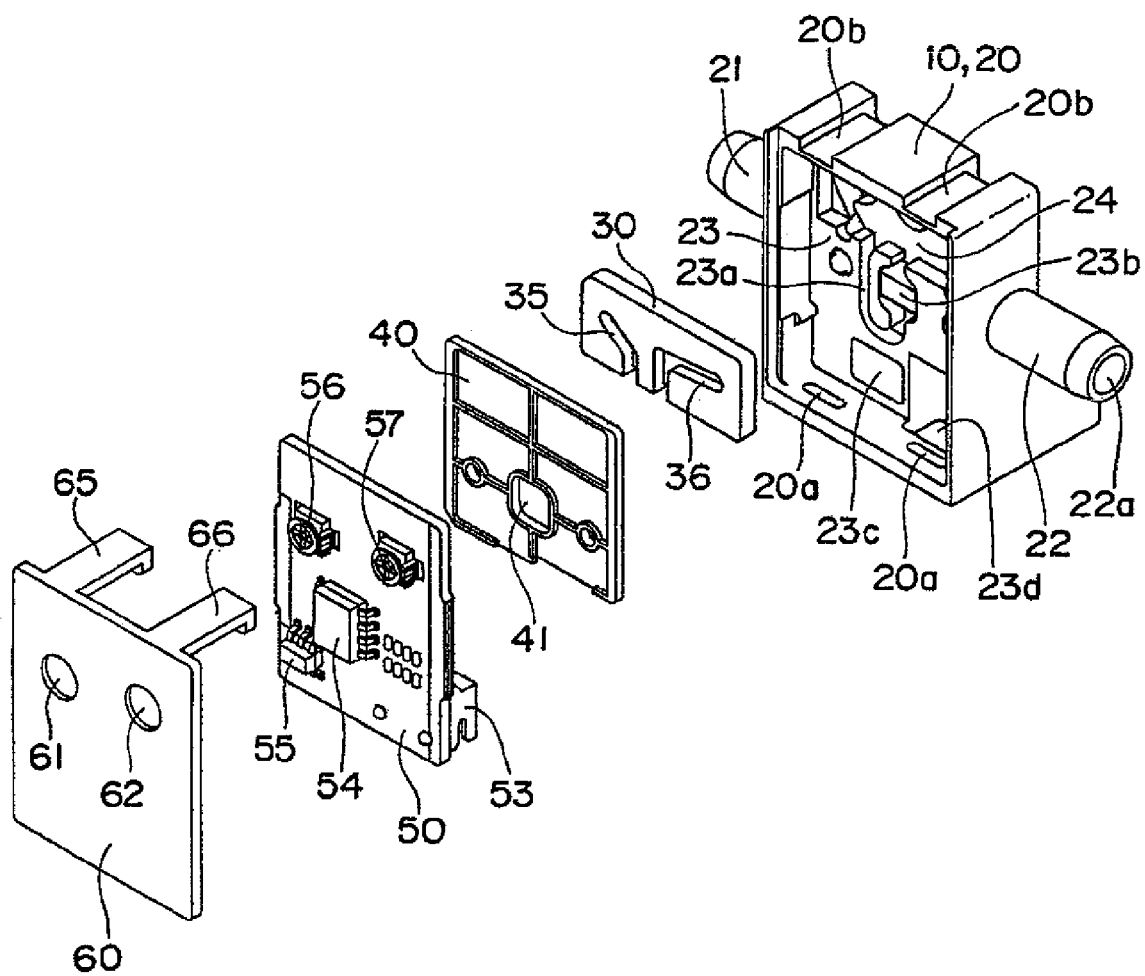
FIG. 3 is an exploded perspective view of the flow rate measuring device shown in FIG. 1.
Figure 4:
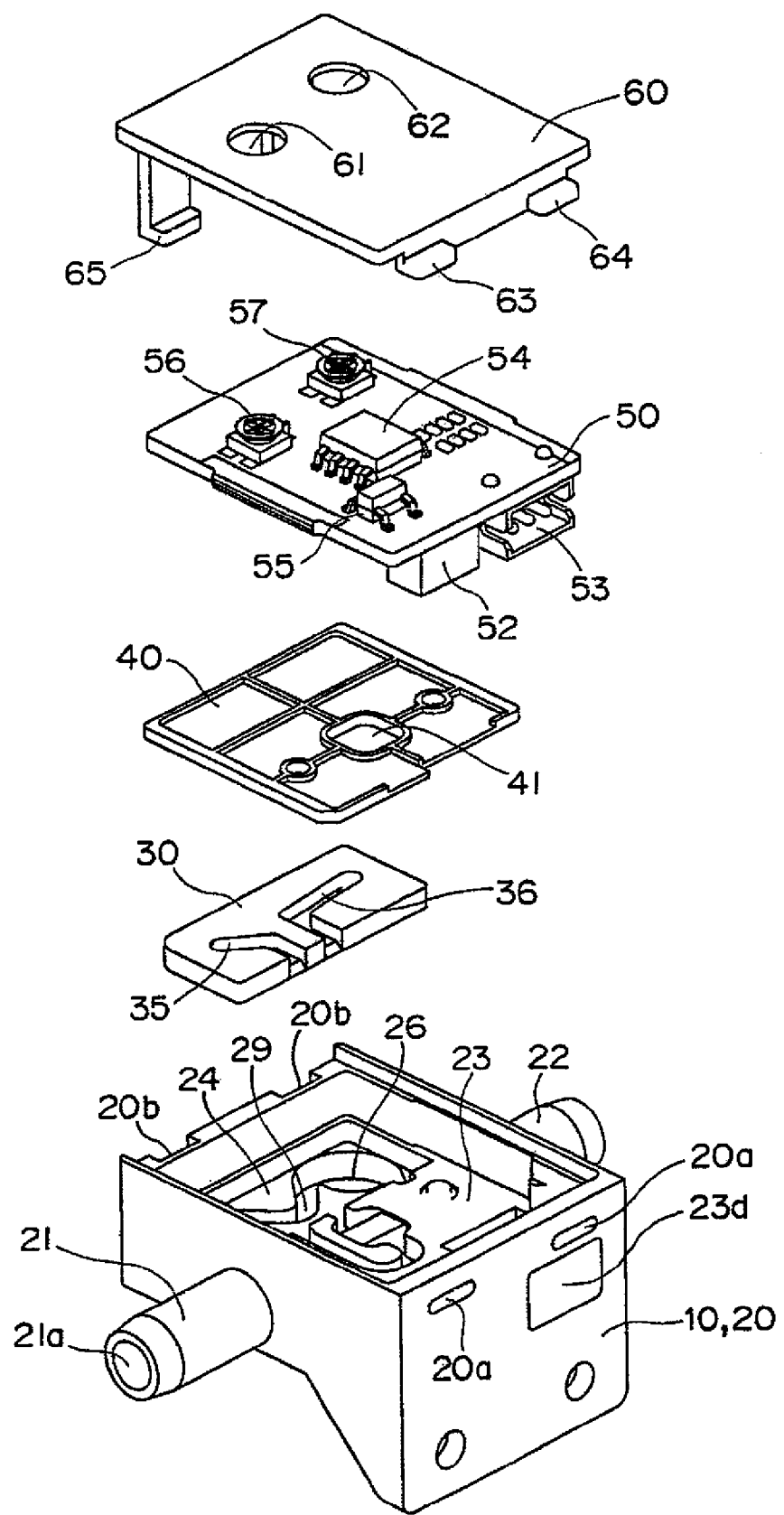
FIG. 4 is an exploded perspective view of the flow rate measuring device shown in FIG. 1, which is seen from above.
Figure 5:
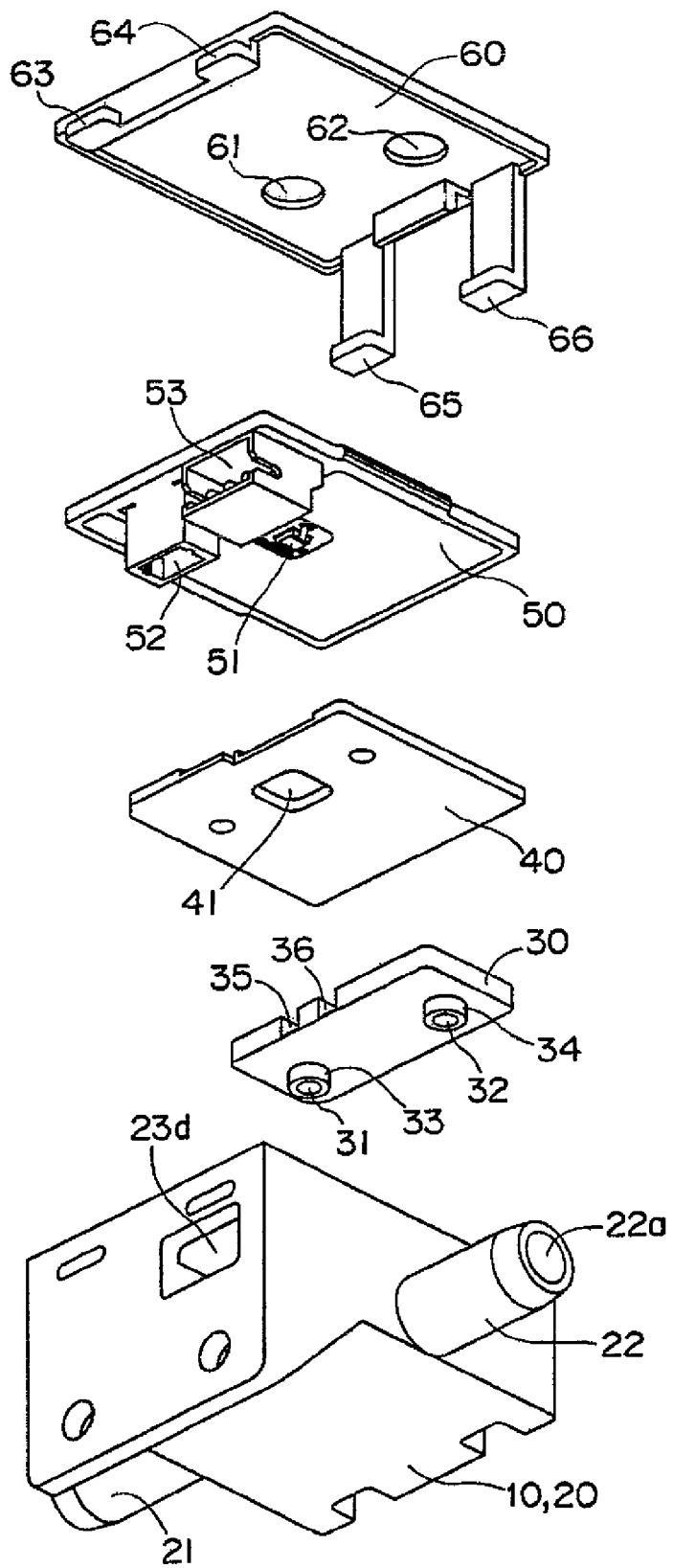
FIG. 5 is an exploded perspective view of the flow rate measuring device shown in FIG. 1, which is seen from below.
Figure 6A:
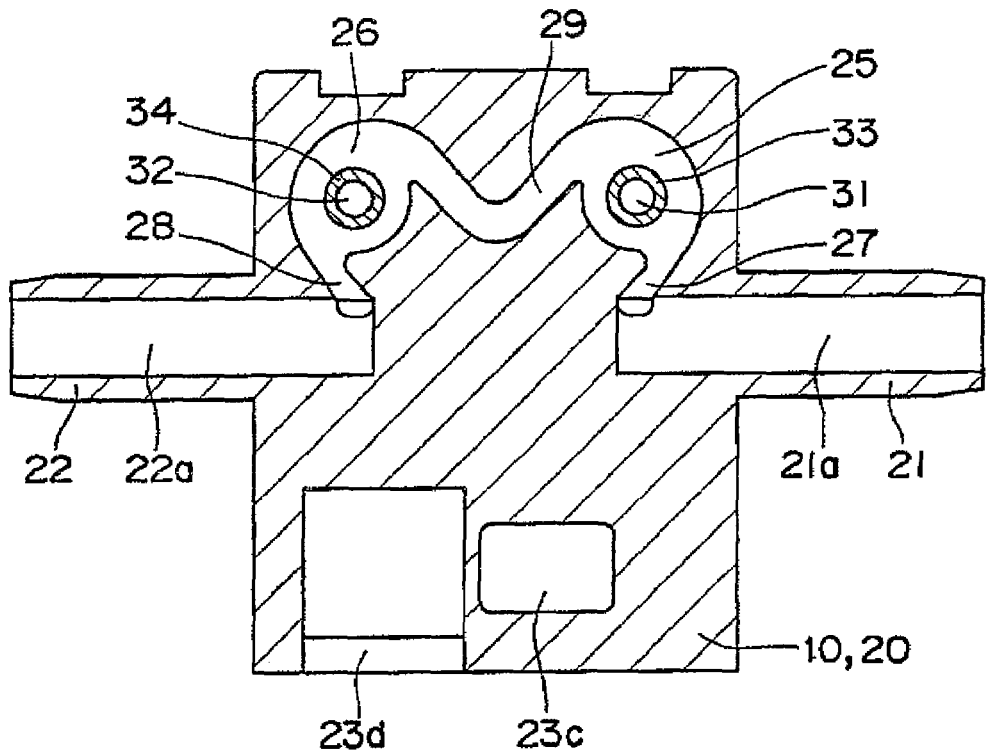
FIG. 6A and FIG. 6B are a longitudinal cross sectional view and a plan view, respectively, which show a flow rate measuring device.
Figure 6B:
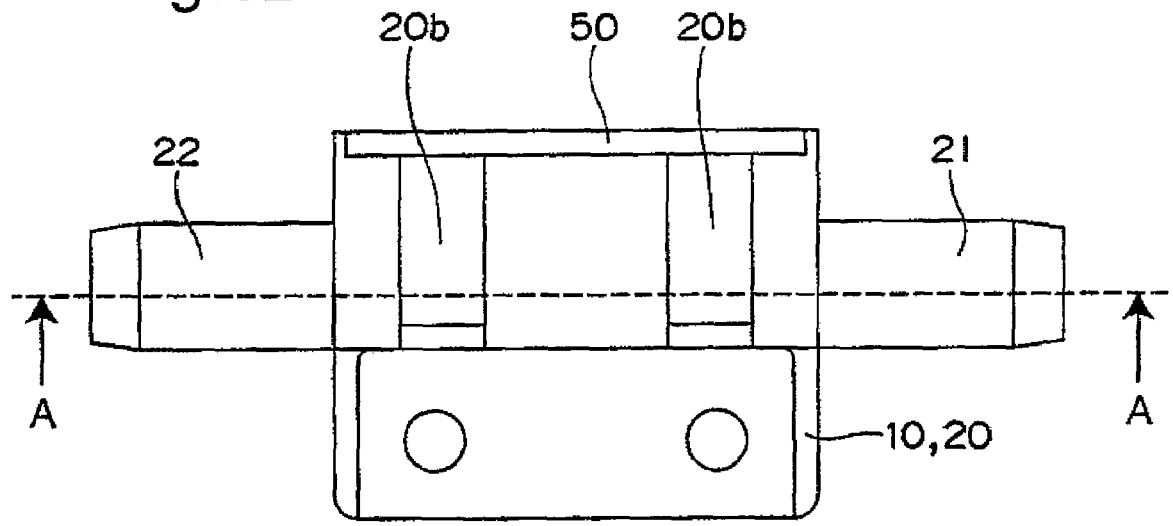

As shown in FIGS. 3 to 5, the flow rate measuring device 10 is constructed of a base 20, a flow channel forming plate 30, a plate-like sealing member 40, a circuit board 50 and a cover 60.

Figure 7:
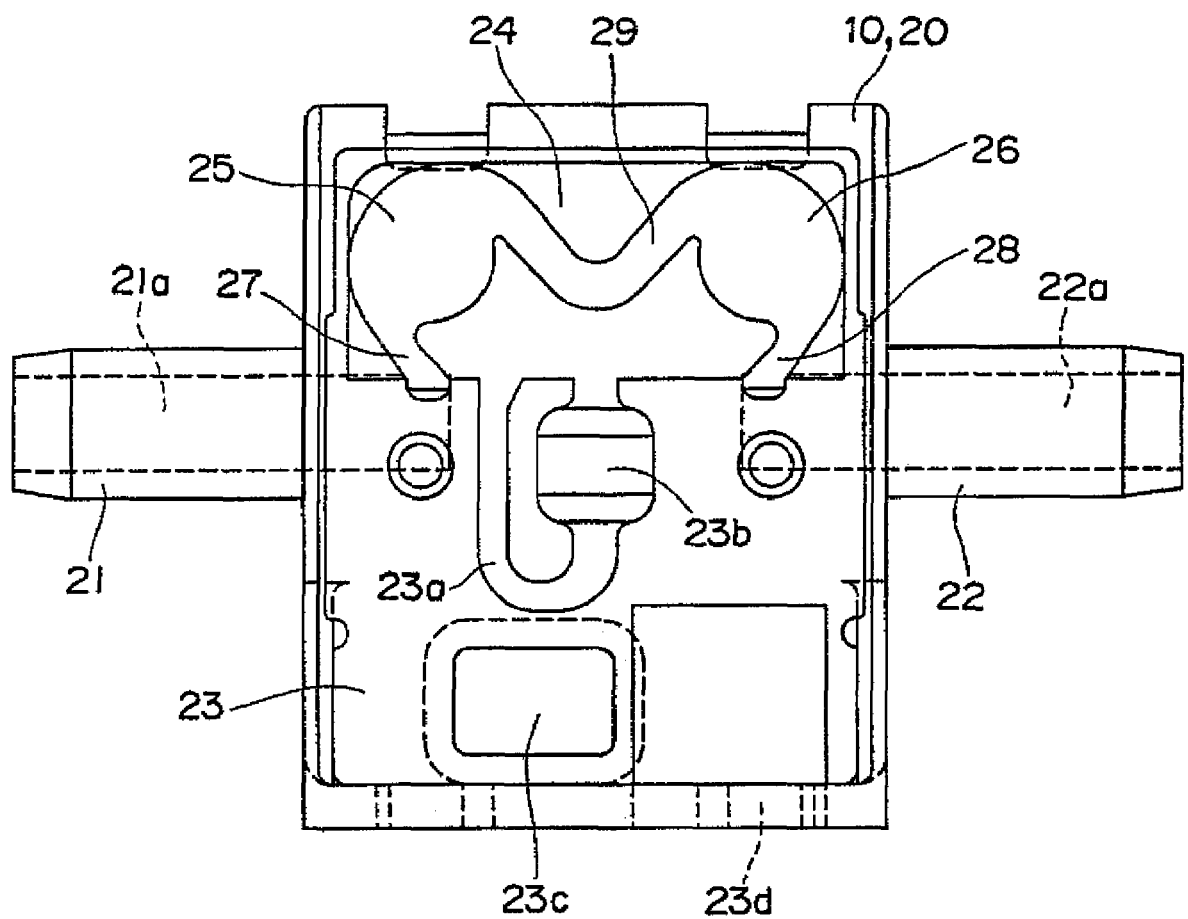
FIG. 7 is a front view of a base shown in FIG. 3.
Figure 8A:
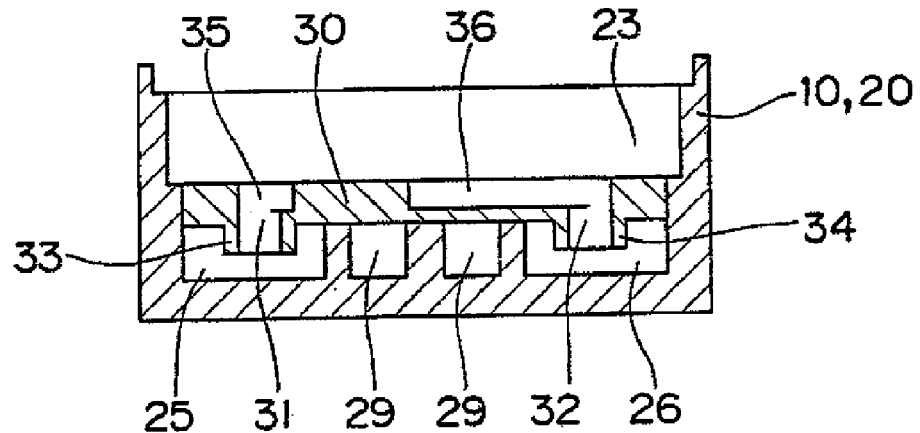
FIG. 8A and FIG. 8B are a transverse cross sectional view and a front view, respectively, in a case where a flow channel forming plate is fitted into the base shown in FIG. 7.
Figure 8B:
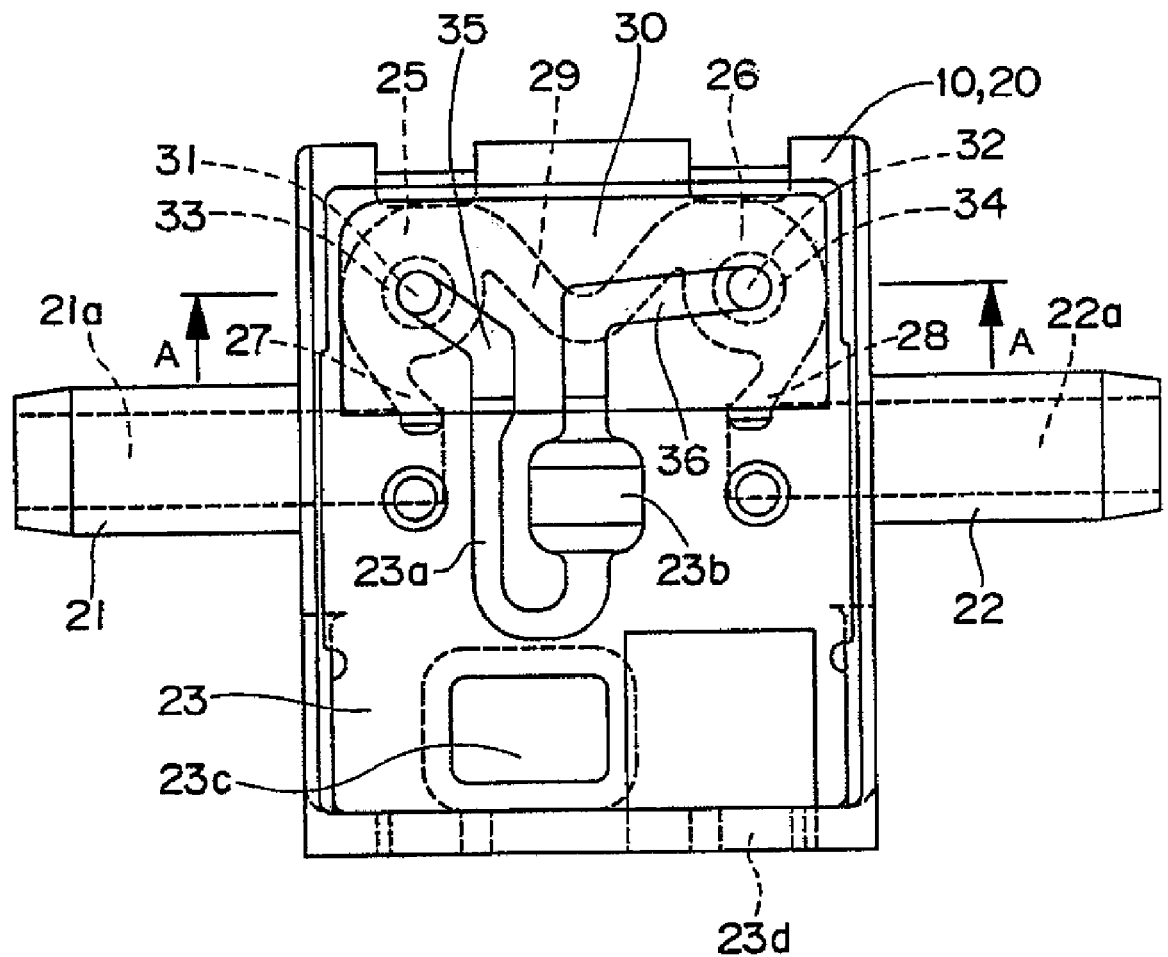
Figure 9:
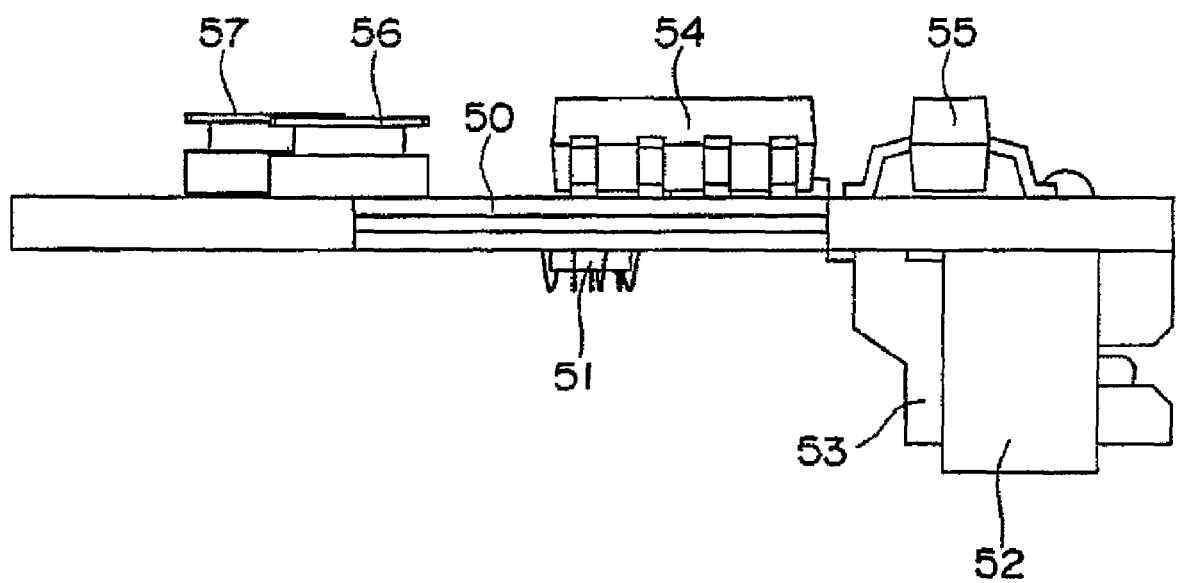
FIG. 9 is a side view of a circuit board shown in FIG. 3.

A first and a second inlet/outlet pipe 21, 22, which are connected to the first and the second connection pipe 12, 13, respectively, are provided coaxially, protruding from both side surfaces of the base 20. The base 20 has, on its rear surface side, a recessed portion 23 for housing internal components, which will be described below, and a recess 24 having a deeper depth than that of the recessed portion 23 is formed in one side portion of a bottom surface of the recessed portion 23. Further, as shown in FIG. 7, a pair of left and right first and second centrifugal chambers 25, 26 are formed in a bottom surface of the recess 24. The first and the second centrifugal chamber 25, 26 communicate with a first and a second secondary flow channel 21a, 22a of the first and the second inlet/outlet pipe 21, 22 through a first and a second guiding flow channel 27, 28, respectively. The first and second centrifugal chambers 25, 26 communicate with each other through an intermediate flow channel 29 bent in a generally V-shape. The first guiding flow channel 27 is formed so as to be inclined in a direction opposite to a flow direction of the first secondary flow channel 21a, while the second guiding flow channel 28 is formed so as to be line symmetrical with respect to the first guiding flow channel 27. Further, in the bottom surface of the recessed portion 23, a detection space portion 23b is formed in a manner so as to communicate with the recess 24 through a J-shaped communication flow channel 23a. Furthermore, a connector hole 23c is formed on one side of the bottom Surface of the recessed portion 23, and a connector hole 23d is also provided on an inner surface of the recessed portion 23.

Angles of the first and the second guiding flow channel 27, 28 with respect to the first and the second secondary flow channel 21a, 22a are each 45° or more and less than 90°, preferably 55° or more and less than 90°. The reason therefor is that if each angle is less than 45°, a pressure loss becomes too large, and if the angle is 90° C. or more, a desired centrifugal force is not obtained.

As for a bending degree of the intermediate flow channel 29, it is preferred that the intermediate flow channel 29 have an inclination generally parallel to the first and second guiding flow channels 27, 28. Specifically, it is 50° or more and less than 180°, preferably 80° or more and less than 180°. The reason therefor is that if it is less than 50°, a pressure loss becomes too large, and if it is 180° or more, a desired centrifugal force is not obtained.

As shown in FIGS. 3 to 5, the flow channel forming plate 30 has a planar shape that can be fitted into the recess 24, and is formed with a first and a second flow dividing hole 31, 32 in positions corresponding to the first and the second centrifugal chamber 25, 26, respectively. A lower surface of the flow channel forming plate 30 is formed with a first and a second cylindrical portion 33, 34, which communicate with the first and the second flow dividing hole 31, 32, respectively. On the other hand, an upper surface of the flow channel forming plate 30 is formed with a first and a second flow dividing channel 35, 36, which communicate with the first and the second centrifugal chamber 25, 26 from the first and the second flow dividing hole 31, 32, respectively. Furthermore, the first and second flow dividing channels 35, 36 can communicate with the communication flow channel 23a and the detection space portion 23b, respectively.

The first and second cylindrical portions 33, 34 preferably have a height dimension of about one third to two thirds of that of the first and second centrifugal chambers 25, 26, particularly about 50% thereof. The reason therefor is that if the first and second cylindrical portions 33, 34 are too short, dust is liable to be included, while if the first and second cylindrical portions 33, 34 are too long, a fluid becomes hard to flow into the first and second flow dividing channels smoothly.

According to the present embodiment, by adjusting diameters of the first and second flow dividing holes 31, 32, a flow dividing ratio of a flow rate of a fluid discharged to the intermediate flow channel 29 to a flow rate of a fluid flowing through the detection space portion 23b can be adjusted. Therefore, even if the flow rates to be measured are largely different from each other, the flow rates can easily be adjusted by merely replacing the flow channel forming plate 30 having the flow dividing holes 31, 32 with a flow channel forming plate having flow dividing holes with different diameters. As a result, there is an advantage that an optimal specification can be provided without changing a detection element 51 described below, which is expensive and takes time for replacement.

The plate-like sealing member 40 has a planar shape that can be fitted into the recessed portion 23 of the base 20, and is provided with a detection opening 41 in a position corresponding to the detection space portion 23b. Therefore, by fitting the plate-like sealing member 40 into the recessed portion 23 of the base 20, the detection space portion 23b of the base 20 can be visually checked from the detection opening 41.

The circuit board 50 has a planar shape that can be fitted into the recessed portion 23 of the base 20, and on its front face, a detection element 51 is placed at a position corresponding to the detection space portion 23b of the base 20, and connectors 52, 53 are placed at positions corresponding to the connector holes 23c, 23d on the base 20, respectively. Examples of the detection element 51 include a MEMS flow sensor and a propeller type sensor, for example. Further, on a rear face of the circuit board 50, a control element 54 and a voltage-adjusting element 55 are mounted, and adjusting elements 56, 57 that are operable from outside are placed.

Therefore, by fitting the circuit board 50 into the recessed portion 23 of the base 20, the detection element 51 is positioned in the detection space portion 23b, the connectors 52, 53 are fitted into the connector holes 23c, 23d, respectively, and the connectors 52, 53 are connectably exposed from the holes 23c, 23d. In addition, it is sufficient if there is at least one of the connectors 52, 53, and the remaining one may serve as a dummy.

The cover 60 has a planar shape that can be fitted onto an opening edge portion of the recessed portion 23 of the base 20, and is provided with adjustment openings 61, 62 in positions corresponding to the adjusting elements 56, 57, respectively, on the circuit board 50. Further, one side edge portion of the cover 60 is formed with a pair of engagement pawls 63, 64 that are engaged with engagement openings 20a, 20a in the base 20, while an opposite one side edge portion is formed with a pair of elastic arm portions 65, 66 that are engaged with engagement grooves 20b, 20b in the base 20.

Therefore, the engagement pawls 63, 64 of the cover 60 are engaged with the engagement openings 20a, 20a in the base 20 in which the flow channel forming plate 30, the plate-like sealing member 40, and the circuit board 50 are incorporated, and the elastic arm portions 65, 66 are engaged with the engagement grooves 20b, 20b in the base 20, whereby assembly work is completed. Then, the adjusting elements 56, 57 are operably exposed from the adjustment openings 61, 62.

Next, a fluid flow when a fluid is flowed through the flow rate measuring device will be described.

First, a fluid, which has flowed in the first secondary flow channel 21a from the upstream side of the primary flow channel 15 of the primary flow pipe 51, flows into the first centrifugal chamber 25 from the first guiding flow channel 27. At this time, since the first guiding flow channel 27 is inclined toward the first secondary flow channel 21a, the fluid flows along a wall surface of the first centrifugal chamber 25 due to its gushing effect without lowering a flow velocity of the fluid, and a centrifugal force acts on the fluid. The centrifugal force is proportional to a square of velocity, and inversely proportional to radius of curvature. For that reason, dust in the fluid is unevenly distributed on the wall surface side.

Furthermore, the fluid having flowed into the first centrifugal chamber 25 flows into the second centrifugal chamber 26 through the intermediate flow channel 29, and flows out into the second secondary flow channel 22a through the second guiding flow channel 28. Since the intermediate flow channel 29 is bent in a generally V-shape, a gushing effect is obtained in the second centrifugal chamber 26, and the fluid can be effectively discharged.

On the other hand, by the centrifugal force that acts in the first centrifugal chamber 25, dust unevenly flows along the wall surface of the first centrifugal chamber 25. Therefore, a clean fluid not including dust flows out into the first flow dividing channel 35 from the first flow dividing hole 31 communicating with the first cylindrical portion 33. Then, after flowing into the detection space portion 23b through the communication flow channel 23a, the fluid flows through the second flow-dividing channel 36, and flows into the second centrifugal chamber 26 from the second cylindrical portion 34 through the second flow dividing hole 32. Furthermore, the fluid flows out into the primary flow channel 15 from the second guiding flow channel 28 through the second secondary flow channel 22a, while merging with a fluid having flowed through the intermediate flow channel 29 in the second centrifugal chamber 26.

Figure 10A:
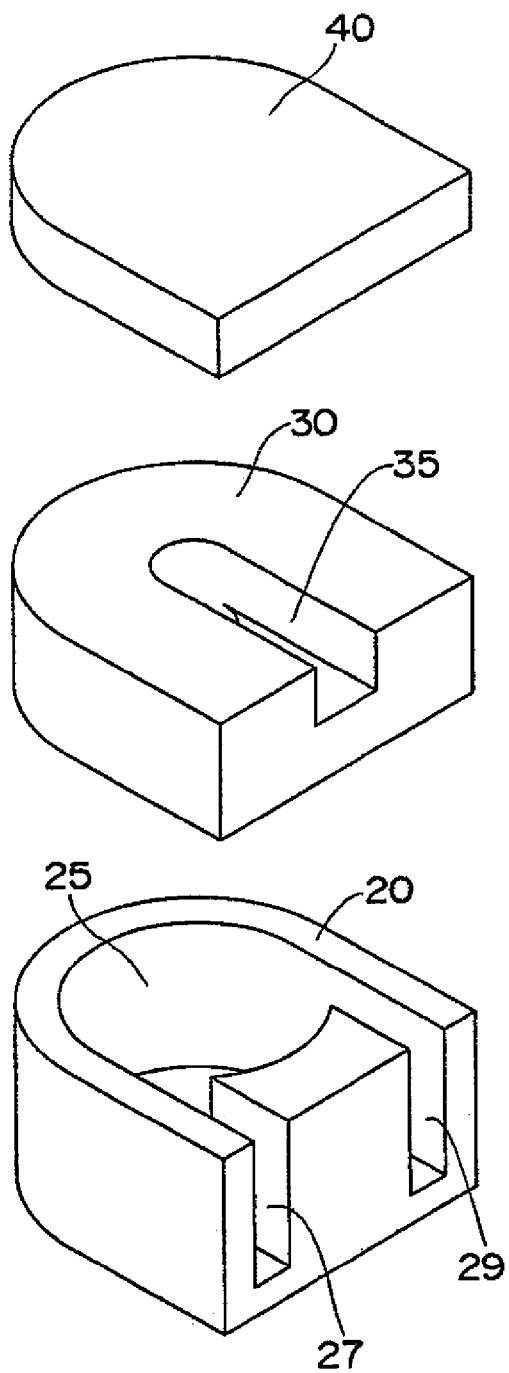
FIG. 10A, FIG. 10B and FIG. 10C are an exploded perspective view, a longitudinal cross sectional view and a transverse cross sectional view, respectively, which are schematically shown in order to describe the shape of a flow channel.
Figure 10B:
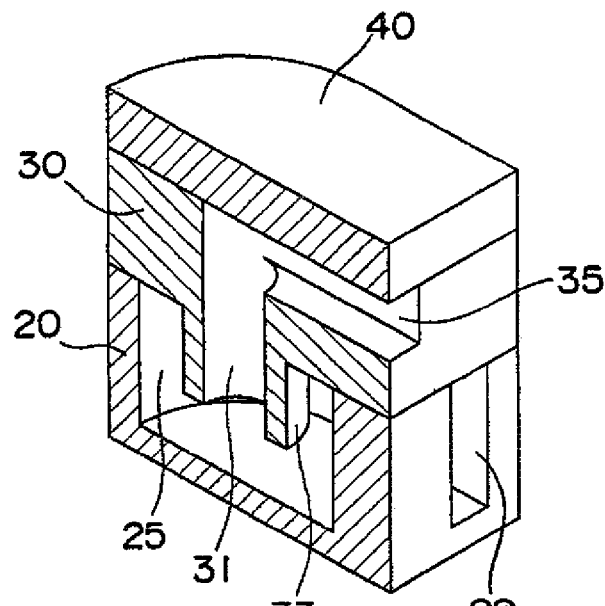
Figure 10C:
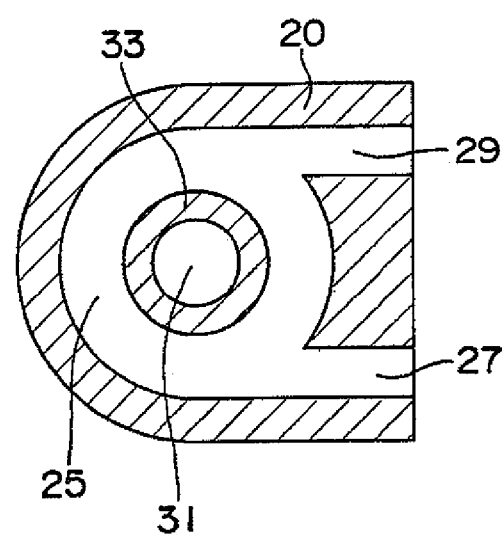
Figure 11A:
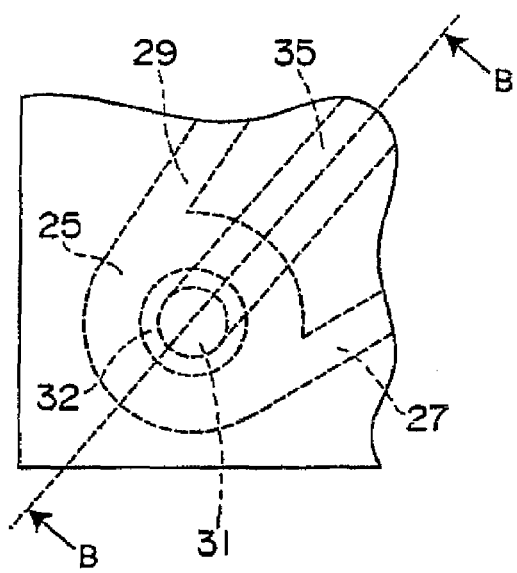
FIG. 11A, FIG. 11B, FIG. 11C and FIG. 11D are a plan view, a longitudinal cross sectional view, a front view and a transverse cross sectional view, respectively, which are schematically shown in order to describe a flow channel of a different shape.
Figure 11B:
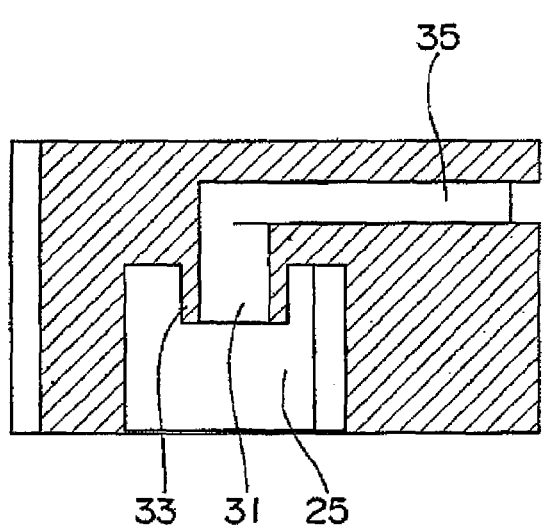
Figure 11C:
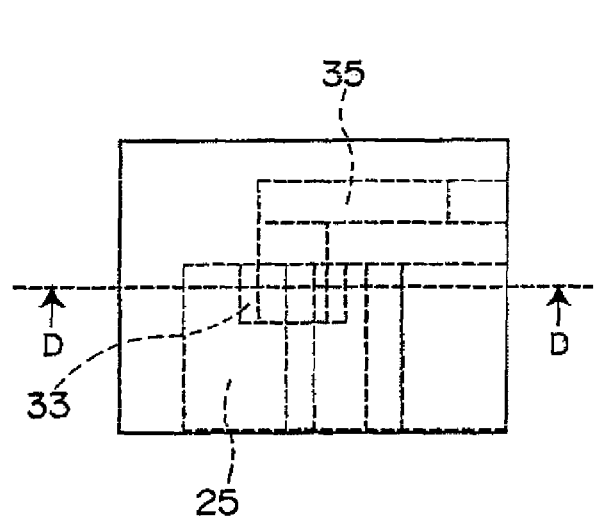
Figure 11D:
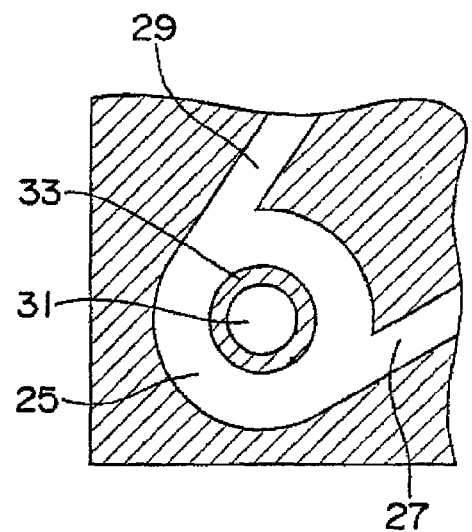
Figure 12A:
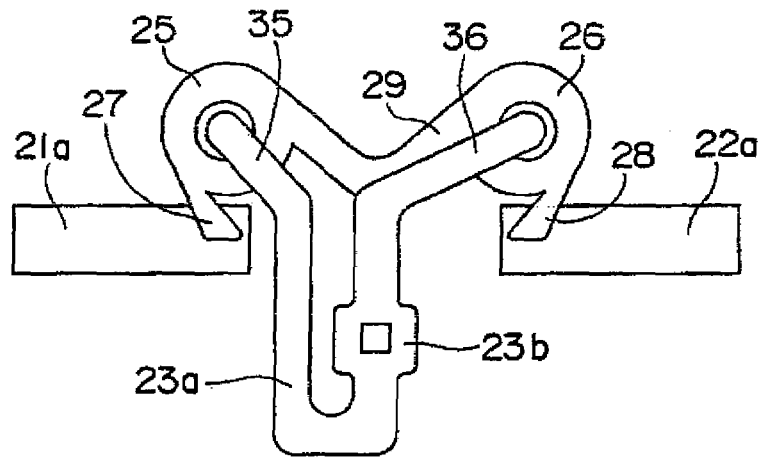
FIG. 12A, FIG. 12B and FIG. 12C are a plan view, a perspective view and a perspective view as seen in a different angle, respectively, which only illustrate a flow channel shape.
Figure 12B:
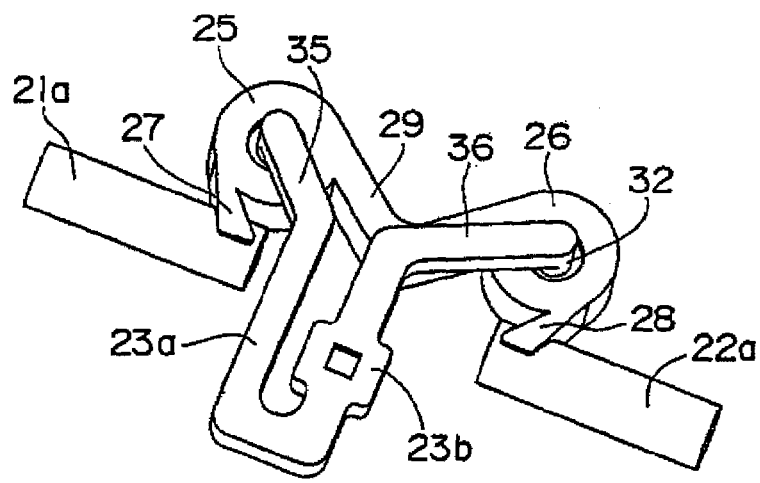
Figure 12C:
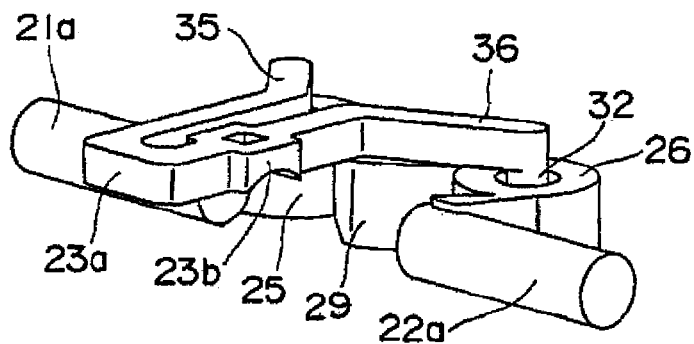

In the above channel, for example, the first guiding flow channel 27 and the intermediate flow channel 29 may be formed so as to be parallel to each other as shown in FIG. 10. Alternatively, they may be formed so as to form an angle of less than 90° as shown in FIG. 11.

Further, as shown in FIG. 11, the flow channel forming plate and the plate-like sealing member may be formed by integral molding. According to the present embodiment, there is an advantage of reducing the number of components and the number of assembling processes.

Furthermore, it is a matter of course that the angle and size of the first and second guiding flow channels 27, 28 and the intermediate flow channel 29, and the diameters of the first and second flow dividing holes 31, 32 may be changed as required.

EXAMPLES

Example 1

Figure 13A:
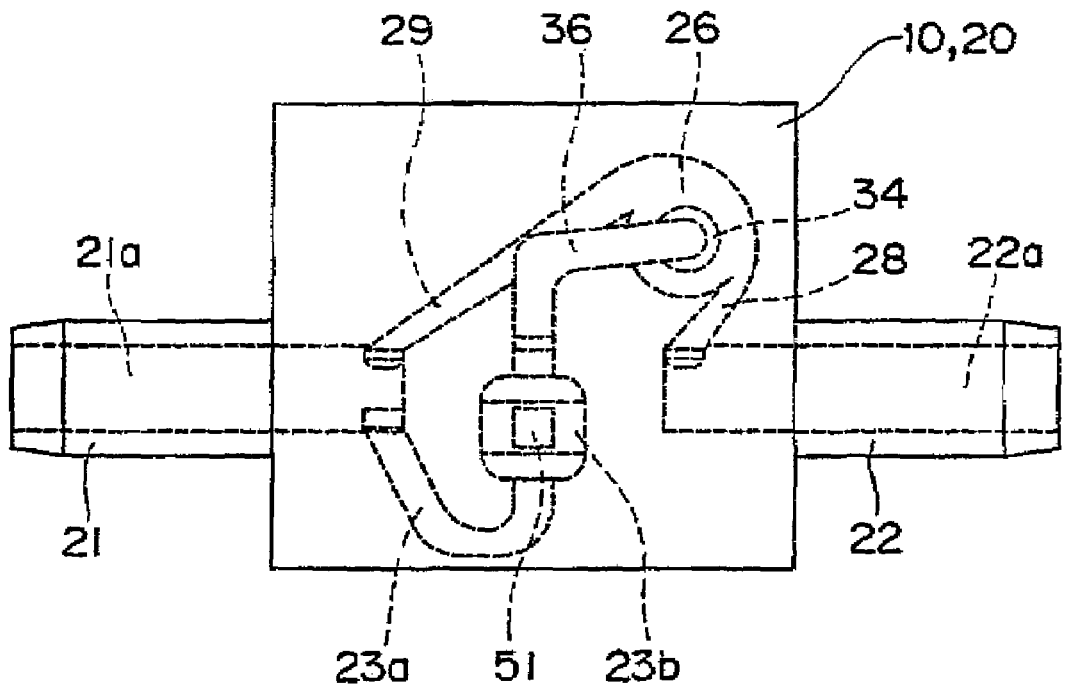
FIG. 13A and FIG. 13B are plan views schematically showing flow channels of Example 1 and Comparative Example 1, respectively.

As shown in FIG. 13A, the guiding flow channel extending from the secondary flow channel 22a to the inside of the centrifugal chamber 26 was arranged at an angle of 55° with respect to a flow direction of the secondary flow channel 22a, and the number of particles passing through the inside of the detection space portion 23b was calculated.

Analysis conditions were as follows. 10000 Particles having a diameter of 3 μm were put in at one time under conditions of a particle density of 3000 kg/m³ and an incoming flow rate of 1 L/min. The number of particles that passed the detection space portion 23b was counted. Therefore, it is shown that the smaller the number of particles, the less particles flow into the detection space portion 23b. The calculation results are shown in FIG. 15A.

Comparative Example 1

Figure 13B:
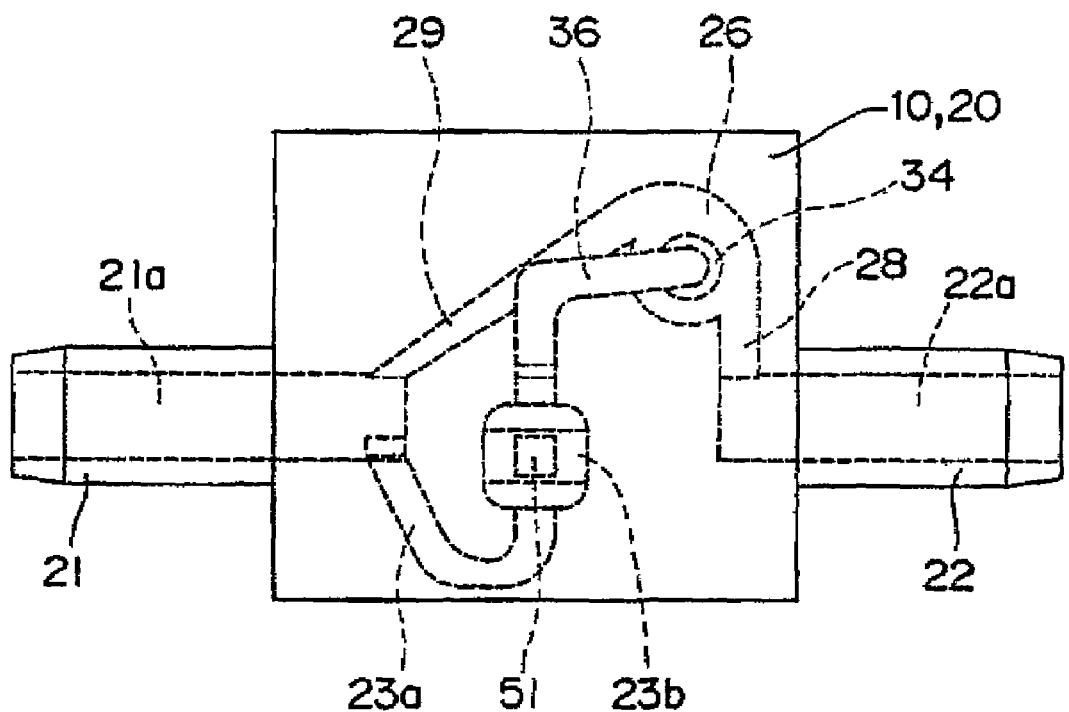

As shown in FIG. 13B, Comparative Example 1 is almost the same as Example 1. A difference is that the guiding flow channel 28 was extended in a direction generally perpendicular to the secondary flow channel 22a and communicated with the centrifugal chamber 26. The calculation results are shown in FIG. 15A.

As is apparent from FIG. 15A, it was found that the number of particles passing through the detection space portion 23b was much smaller in Example 1 than that of those passing through the detection space portion in Comparative Example 1. Therefore, it was found that Example 1 had fewer chances that dust and the like adhered to the detection element 51 compared with Comparative Example 1.

Example 2

Figure 14A:
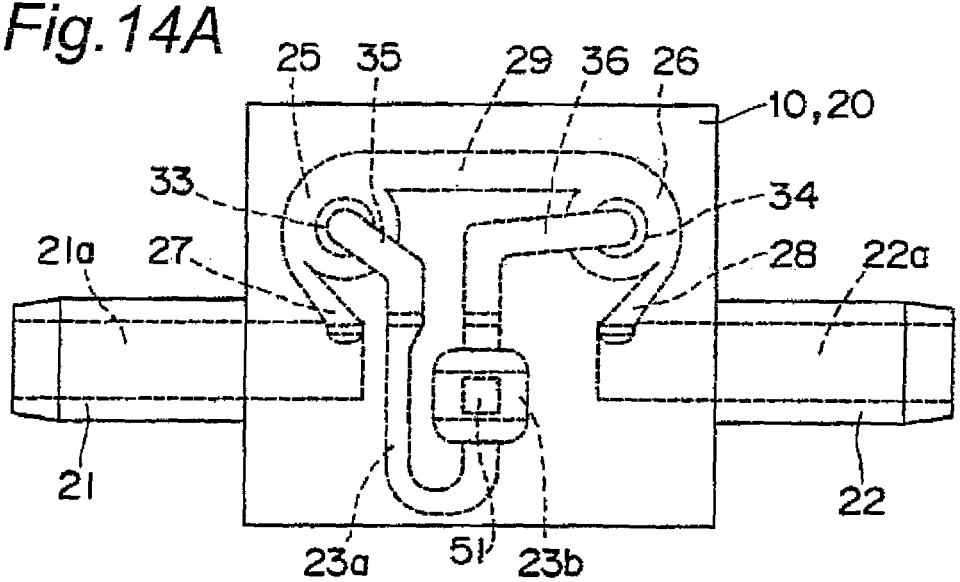
FIG. 14A, FIG. 14B and FIG. 14C are plan views schematically showing flow channels of Examples 2, 3 and Comparative Example 2, respectively.

As shown in FIG. 14A, each of the first and second guiding flow channels 27, 28 was inclined at an angle of 55° with respect to a flow direction of each of the first and second secondary flow channels 21a, 22a, and the intermediate flow channel 29 was formed straight, parallel to the first and second secondary flow channels 21a, 22a.

Then, particles were put in under the same conditions as those of Example 1. The number of particles passing through the detection space portion 23b was calculated and the number of particles remaining in the flow channels was calculated. The calculation results are shown in FIG. 15B and FIG. 15C.

Example 3

Figure 14B:
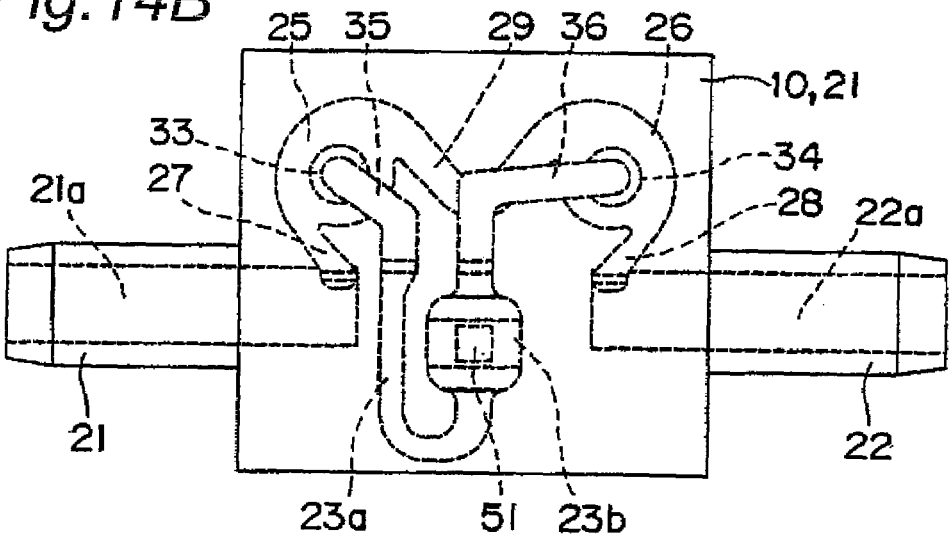

As shown in FIG. 14B, Example 3 is almost the same as Example 2 described above. A difference is that the intermediate flow channel 29 was bent at an angle of 80° to form a generally V-shape.

Then, particles were put in under the same conditions as those of Example 1. The number of particles passing through the detection space portion 23b was calculated and the number of particles remaining in the flow channels was calculated. The calculation results are shown in FIG. 15B and FIG. 15C.

Comparative Example 2

Figure 14C:
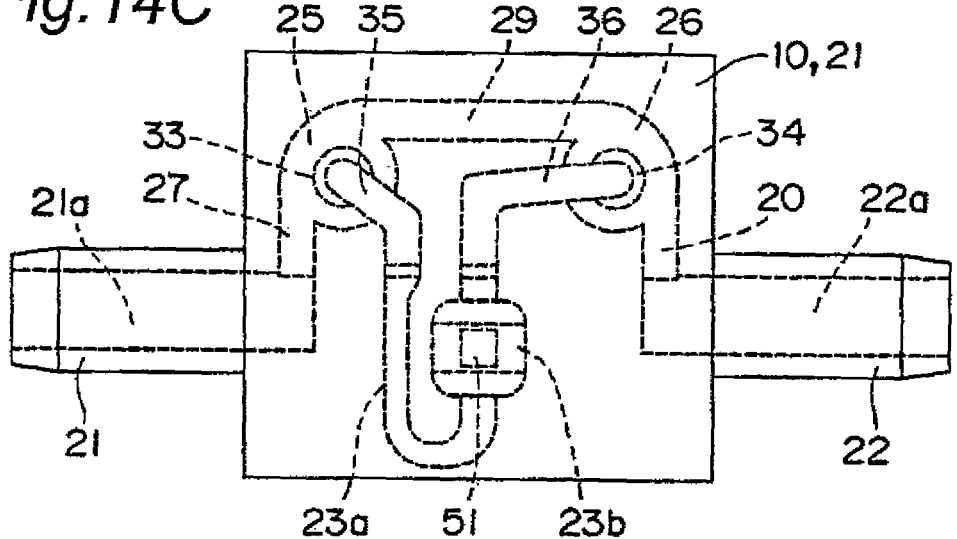

As shown in FIG. 14C, each of the first and second guiding flow channels 27, 28 was extended in a direction perpendicular to each of the first and second secondary flow channels 21a, 22a, and the intermediate flow channel 29 was formed straight, parallel to the first and second secondary flow channels 21a, 22a.

Then, particles were put in under the same conditions as those of Example 1. The number of particles passing through the detection space portion 23b was calculated and the number of particles remaining in the flow channels was calculated. The calculation results are shown in FIG. 15B and FIG. 15C.

As is apparent from FIG. 15B, it was found that the number of particles passing through the detection space portion 23b was much smaller in Examples 2 and 3 than that of those passing through the detection space portion 23b in Comparative Example 2. Therefore, it was found that Examples 2 and 3 had fewer chances that dust and the like adhered to the detection element compared with Comparative is Example 2.

Further, as is apparent from FIG. 15C, it was also found that the number of particles remaining in the channels was smaller in Example 3 than that of those remaining in the channels in Example 2. The reason for this is considered as follows. If the intermediate flow channel 29 is bent in a generally V-shape, a flow velocity on a discharge side in the centrifugal chamber increases, and a centrifugal force increases, whereby dust is unlikely to accumulate. This result demonstrates that the effect was more improved by provision of the generally V-shaped intermediate flow channel 29.

Furthermore, when the fluid is flowed from a normal and a reverse direction, a relationship between a flow rate of a fluid that has flowed in and an average flow velocity in the detection space portion was calculated. The calculation results are shown in FIG. 16A.

Figure 16A:
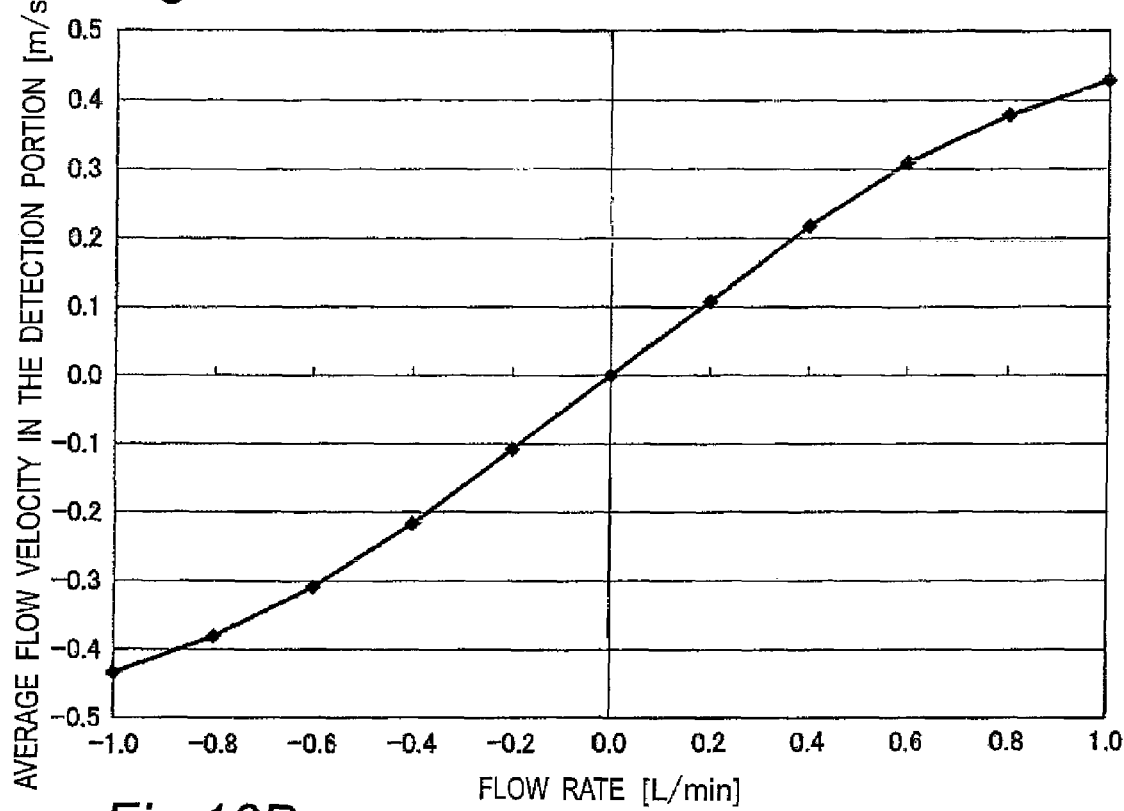
FIG. 16A and FIG. 16B are graph charts showing different calculation results of Example 3.
Figure 16B:
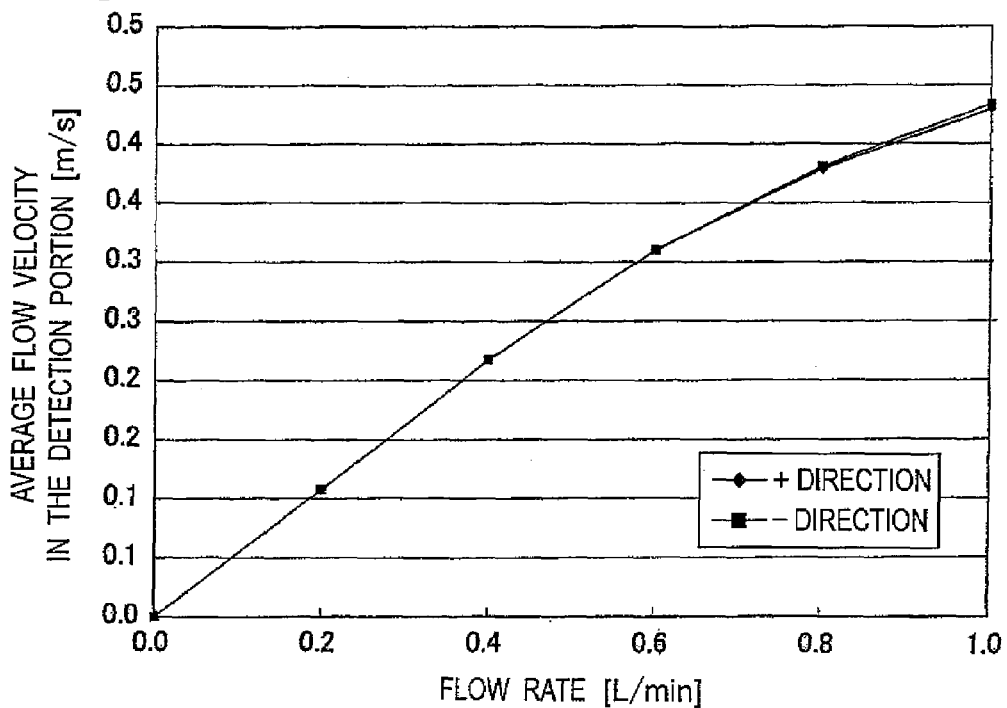

As is apparent from FIG. 16B showing a case where a curve of FIG. 16A was folded at a coordinate origin, the folded curves roughly overlap each other. Therefore, it was found that even if the flowing directions of the fluid were different, an average flow velocity in the detection space portion was roughly constant.

Therefore, the conclusion based on FIGS. 15B and 15C, and the conclusion based on FIGS. 16A and 16B have shown that, according to Example 3, dust is unlikely to penetrate into the detection space portion even if the fluid is flowed from the normal and the reverse direction, and dust is unlikely to remain in the flow channels.

INDUSTRIAL APPLICABILITY

The flow rate measuring device of the present invention may be not only connected to the primary flow pipe through the connection pipe but also connected to the primary flow pipe directly. Further, the flow rate measuring device may be used not only for flow rate measurement but also as a flow velocity measuring device.

The invention claimed is:

1. A flow rate measuring device in which a flow channel is formed, said flow channel comprising:
a centrifugal chamber having a curved wall surface;
a guiding flow channel allowing an external flow channel to communicate with one end of the wall surface of the centrifugal chamber from a tangential direction thereof;
a discharge flow channel communicating with the other end of the wall surface of the centrifugal chamber from a tangential direction thereof; and
a flow dividing channel communicating with the centrifugal chamber, generally perpendicular to a curved direction of the wall surface; wherein
a detection element is placed on a downstream side of the flow dividing channel, a fluid that has been introduced into the centrifugal chamber from the external flow channel through the guiding flow channel is divided with the discharge flow channel and the flow dividing channel, and a flow rate of a fluid taken out from the flow dividing channel is measured by the detection element.

2. The flow rate measuring device according to claim 1, in which a flow channel forming plate is interposed between a first layer base plate and a second layer base plate;

between the first layer base plate and the flow channel forming plate, the centrifugal chamber having the curved wall surface, the guiding flow channel allowing the external flow channel to communicate with said one end of the wall surface of the centrifugal chamber from the tangential direction thereof, and the discharge flow channel communicating with said the other end of the wall surface of the centrifugal chamber from the tangential direction thereof are formed; and, between the flow channel forming plate and the second layer base plate, a flow dividing channel, which communicates with the centrifugal chamber through a flow dividing hole provided in the flow channel forming plate, and in which a detection element is placed on its downstream side, is formed, wherein a fluid that has been introduced into the centrifugal chamber from the external flow channel through the guiding flow channel is divided with the discharge flow channel and the flow dividing channel, and a flow rate of a fluid taken out from the flow dividing channel is measured by the detection element.

3. The flow rate measuring device according to claim 2, wherein the guiding flow channel is formed so as to be inclined in a direction opposite to a flow direction of the external flow channel.

4. The flow rate measuring device according to claim 1, wherein the guiding flow channel is formed so as to be inclined in a direction opposite to a flow direction of the external flow channel.

5. The flow rate measuring device according to claim 1, wherein the centrifugal chamber has a cylindrical shape.

6. The flow rate measuring device according to claim 1, wherein one end of the flow dividing channel is formed of a cylindrical portion protruding into the centrifugal chamber.

7. A flow rate measuring device in which a flow channel is formed, said flow channel comprising:

a pair of first and second centrifugal chambers each having a curved wall surface;

a first guiding flow channel allowing a first external flow channel to communicate with one end of the wall surface of the first centrifugal chamber from a tangential direction thereof;

an intermediate flow channel communicating with the other end of the wall surface of the first centrifugal chamber from a tangential direction thereof, as well as communicating with one end of the wall surface of the second centrifugal chamber from a tangential direction thereof;

a second guiding flow channel allowing a second external flow channel to communicate with the other end of the wall surface of the second centrifugal chamber from a tangential direction thereof;

a first flow dividing channel communicating with the first centrifugal chamber, generally perpendicular to a curved direction of the wall surface of the first centrifugal chamber;

a second flow dividing channel communicating with the second centrifugal chamber, generally perpendicular to a curved direction of the wall surface of the second centrifugal chamber; and a detection space portion, which allows the first flow dividing channel and the second flow dividing channel to communicate with each other, and in which a detection element is placed; wherein a fluid that has been introduced into the first centrifugal chamber from the first external flow channel though the first guiding flow channel is divided with the intermediate flow channel and the first flow dividing channel, and a flow rate of a fluid taken out from the first flow dividing channel can be measured by the detection element, and a fluid that has been introduced into the second centrifugal chamber from the second external flow channel through the second guiding flow channel is divided with the intermediate flow channel and the second flow dividing channel, and a flow rate of a fluid taken out from the second flow dividing channel can be measured by the detection element.

8. The flow rate measuring device according to claim 7, wherein each of the first and second guiding flow channels is formed so as to be inclined in a direction opposite to a flow direction of each of the first and second external flow channels.

9. The flow rate measuring device according to claim 8, wherein the intermediate flow channel is bent in a generally V-shape.

10. The flow rate measuring device according to claim 7, wherein the intermediate flow channel is bent in a generally V-shape.

11. The flow rate measuring device according to claim 7, wherein the centrifugal chamber has a cylindrical shape.

12. The flow rate measuring device according to claim 7, wherein one end of the flow dividing channel is formed of a cylindrical portion protruding into the centrifugal chamber.

13. A flow rate measuring device in which a flow channel forming plate is interposed between a first layer base plate and a second layer base plate;

between the first layer base plate and the flow channel forming plate, a pair of first and second centrifugal chambers each having a curved wall surface, a first guiding flow channel allowing a first external flow channel to communicate with one end of the wall surface of the first centrifugal chamber from a tangential direction thereof, an intermediate flow channel communicating with the other end of the wall surface of the first centrifugal chamber from a tangential direction thereof, as well as communicating with one end of the wall surface of the second centrifugal chamber from a tangential direction thereof, and a second guiding flow channel allowing a second external flow channel to communicate with the other end of the wall surface of the second centrifugal chamber from a tangential direction thereof are formed; and, between the flow channel forming plate and the second layer base plate, a first flow dividing channel communicating with the first centrifugal chamber, generally perpendicular to a curved direction of the wall surface of the first centrifugal chamber, and a second flow dividing channel communicating with the second centrifugal chamber, generally perpendicular to a curved direction of the wall surface of the second centrifugal chamber are formed, and a detection space portion, which allows the first flow dividing channel and the second flow dividing channel to communicate with each other, and in which a detection element is placed, is formed, wherein a fluid that has been introduced into the first centrifugal chamber from the first external flow channel though the first guiding flow channel is divided with the intermediate flow channel and the first flow dividing channel, and a flow rate of a fluid taken out from the first flow dividing channel can be measured by the detection element, and a fluid that has been introduced into the second centrifugal chamber from the second external flow channel through the second guiding flow channel is divided with the intermediate flow channel and the second flow dividing channel, and a flow rate of a fluid taken out from the second flow dividing channel can be measured by the detection element.

14. The flow rate measuring device according to claim 13, wherein each of the first and second guiding flow channels is formed so as to be inclined in a direction opposite to a flow direction of each of the first and second external flow channels.

15. The flow rate measuring device according to claim 13, wherein the intermediate flow channel is bent in a generally V-shape.

16. The flow rate measuring device according to claim 13, wherein the centrifugal chamber has a cylindrical shape.

17. The flow rate measuring device according to claim 13, wherein one end of the flow dividing channel is formed of a cylindrical portion protruding into the centrifugal chamber.

* * * * *